(12) United States Patent
Kalidindi et al.

(10) Patent No.: US 11,915,291 B2
(45) Date of Patent: Feb. 27, 2024

(54) METHODS AND SYSTEMS FOR DETERMINING VARIANCE BETWEEN CRITERIA

(71) Applicant: Capital One Services, LLC, McLean, VA (US)

(72) Inventors: Vijayalakshmi Narasimha Raju Kalidindi, Frisco, TX (US); Nick Norcross, Frisco, TX (US); Mani Afsari, McKinney, TX (US); Jeffrey Whalen, Frisco, TX (US); Erika Gaffney, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 120 days.

(21) Appl. No.: 17/453,975

(22) Filed: Nov. 8, 2021

(65) Prior Publication Data

US 2022/0058711 A1 Feb. 24, 2022

Related U.S. Application Data

(63) Continuation of application No. 16/684,229, filed on Nov. 14, 2019, now Pat. No. 11,170,427.

(51) Int. Cl.
*G06Q 30/00* (2023.01)
*G06Q 30/0601* (2023.01)
*G06Q 30/02* (2023.01)
*G06F 16/25* (2019.01)
*G06Q 40/03* (2023.01)

(52) U.S. Cl.
CPC ....... *G06Q 30/0627* (2013.01); *G06F 16/252* (2019.01); *G06Q 30/0278* (2013.01); *G06Q 40/03* (2023.01)

(58) Field of Classification Search
None
See application file for complete search history.

(56) References Cited

U.S. PATENT DOCUMENTS

| | | | |
|---|---|---|---|
| 7,577,582 B1 * | 8/2009 | Ojha | G06Q 30/06 705/26.41 |
| 7,603,290 B1 * | 10/2009 | Tenorio | G06Q 40/04 705/37 |
| 8,660,943 B1 | 2/2014 | Chirehdast | |
| 11,080,725 B2 * | 8/2021 | Dagley | G06F 17/18 |
| 2011/0082804 A1 | 4/2011 | Swinson et al. | |
| 2012/0130778 A1 | 5/2012 | Cotton et al. | |
| 2014/0081751 A1 | 3/2014 | Hogan et al. | |
| 2014/0129386 A1 | 5/2014 | Ghouri et al. | |
| 2016/0189260 A1 | 6/2016 | Nagla | |

(Continued)

*Primary Examiner* — Mila Airapetian
(74) *Attorney, Agent, or Firm* — Bookoff McAndrews, PLLC

(57) ABSTRACT

A computer-implemented method may include receiving a customer submission for a vehicle from a customer device, the customer submission including a plurality of customer criteria; receiving a request from the customer device to provide the customer submission to a merchant device; and receiving a reply from the merchant device, the reply including a plurality of merchant criteria. The computer-implemented method also may include determining a variance between the customer criteria and the merchant criteria, and transmitting, to the merchant device, at least one of the variance or the customer criteria.

20 Claims, 6 Drawing Sheets

(56) References Cited

U.S. PATENT DOCUMENTS

2017/0032440 A1     2/2017  Paton
2017/0220966 A1*    8/2017  Wang ................... G06Q 20/322
2022/0108393 A1*    4/2022  Cataldi ................. G06Q 40/04

* cited by examiner

METHODS AND SYSTEMS FOR DETERMINING VARIANCE BETWEEN CRITERIA

CROSS-REFERENCE TO RELATED APPLICATION(S)

This patent application is a continuation of, and claims the benefit of priority to, U.S. Nonprovisional patent application Ser. No. 16/684,229, filed on Nov. 14, 2019, the entirety of which is incorporated herein by reference.

TECHNICAL FIELD

Various embodiments of the present disclosure relate generally to communication between a user device and a merchant device and, more particularly, to methods and systems for determining a variance between a plurality of criteria.

BACKGROUND

Merchants involved with the sale of high-price, high-value products rely upon frequent communication with customers to facilitate sales. Effective customer communication is especially necessary in competitive markets in which merchants compete with other merchants that offer similar, or even identical, products. Large purchases, such as vehicles, real property, large machines, etc., typically involve one or more additional smaller transactions or costs in addition to the actual cost of the product itself. For example, the purchase of a home may include realtor fees, loan fees and other closing costs, insurance, or other associated costs. The purchase of a vehicle may include an interest rate, loan term, tax, title, and license costs, or other associated costs.

During the transaction (e.g., negotiation) process, a customer may offer an initial offer, or express one or more preferences relating to one or more of the costs associated with the purchase of a high-value product. The merchant may wish to provide a modified offer or counter-offer. Traditionally, this offer and counter-offer process involves estimation by both the customer and the merchant. Thus, the customer may need to repeatedly communicate with the merchant to determine the contents of a merchant's offer. Even when the customer is provided with the merchant's offer, the customer may be unable to directly compare this offer to the customer's initial offer or preferences. This may be particularly problematic when a customer is evaluating the products offered for sale by multiple merchants, the purchase of which involves financing and/or significant expense.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining a variation between differing submissions having a plurality of individual components. Each of the examples disclosed herein may include one or more of the features described in connection with any of the other disclosed examples.

In one aspect, a computer-implemented method may include receiving a customer submission for a vehicle from a customer device, the customer submission including a plurality of customer criteria, receiving a request from the customer device to provide the customer submission to a merchant device, and receiving a reply from the merchant device, the reply including a plurality of merchant criteria. The computer-implemented method may also include determining a variance between the customer criteria and the merchant criteria, and transmitting, to the merchant device, at least one of the variance or the customer criteria.

In another aspect, a computer-implemented method may include receiving a customer submission for a vehicle, the customer submission including a plurality of customer criteria; receiving a merchant reply, the merchant reply including a plurality of merchant criteria; and determining a variance between the customer criteria and the merchant criteria. The computer-implemented method may also include causing a display device to display an indication corresponding to the variance; determining an updated variance; and causing the display device to update the indication based on the updated variance.

In another aspect, a system for providing customer information to a vehicle merchant may include a memory storing instructions and at least one processor executing the instructions to perform a process. The process performed by the at least one processor may include receiving a customer submission for a vehicle, the customer submission including a plurality of customer criteria; and receiving a merchant reply, the merchant reply including a plurality of merchant criteria including at least one of a vehicle price, a trade-in value, a merchant fee, a service contract, a tax cost, a title fee, or a license fee. The process performed by the at least one processor may also include determining a variance between the customer criteria and the merchant criteria; and transmitting the variance to a merchant device, wherein the variance reflects a customer benefit, and wherein the transmitting the variance includes transmitting an indication corresponding to the customer benefit to the merchant device.

According to additional aspects of the disclosure, a non-transitory computer-readable medium stores instructions that, when executed by one or more processors, cause the one or more processors to perform the aforementioned computer-implemented methods or the operations that the aforementioned system is configured to perform.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, a customer submission and a merchant reply may be provided to one or more comparison tools. A variance between the customer criteria and the merchant reply may be determined. The comparison tool may transmit at least one of the variance or the customer criteria to the merchant device. An updated variance may be determined. The comparison tool may cause a display device of the merchant device and/or a user device to display an indication based on the variance or based on an updated variance.

Figure 1:
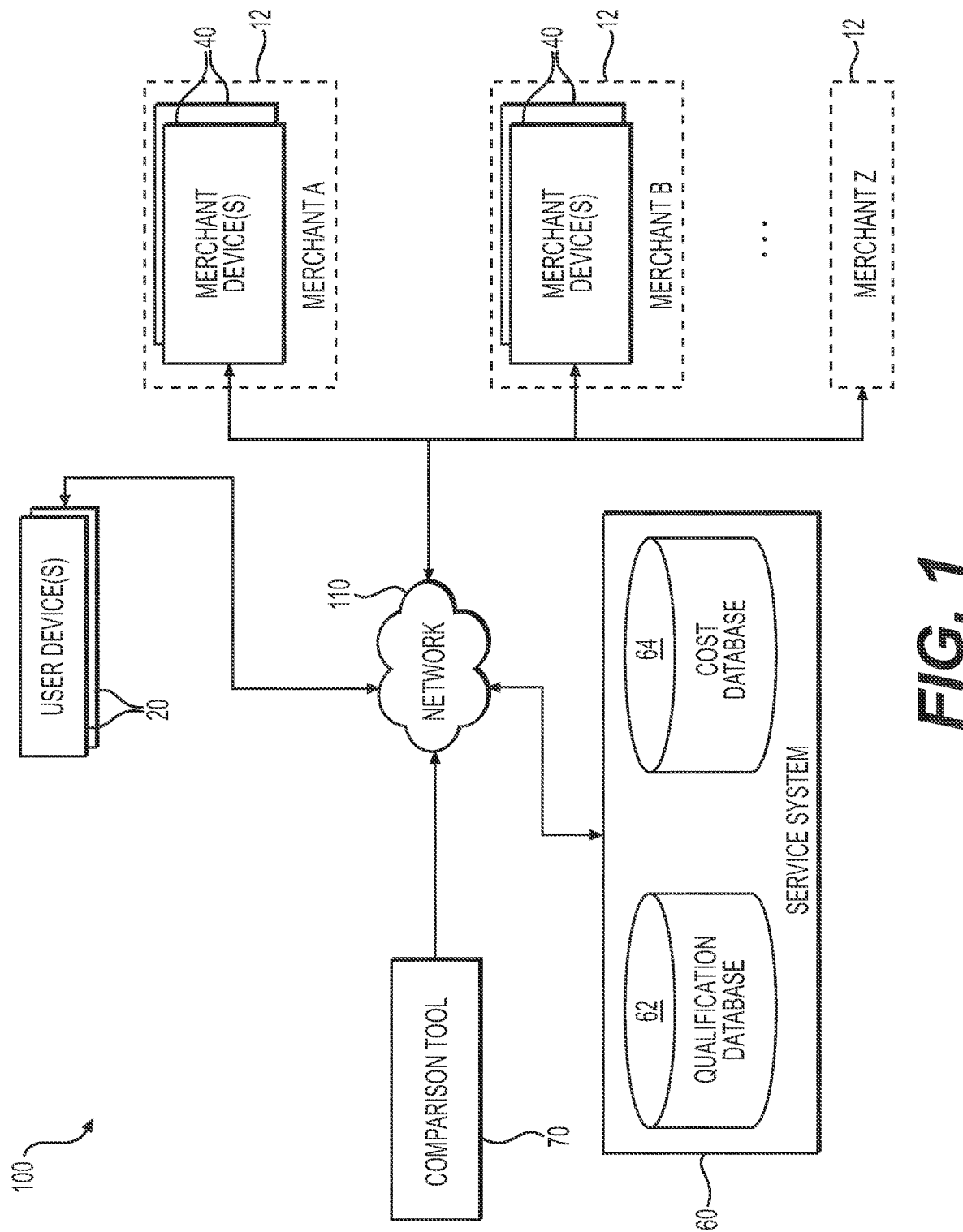
FIG. 1 is a schematic view of an exemplary system environment, according to one or more embodiments.

FIG. 1 illustrates an exemplary system environment 100 for according to one or more embodiments of the present disclosure. The system environment 100 may include computing devices, such as one or more user device(s) 20, one or more merchant device(s) 40, a service system 60, and a merchant or comparison tool system 70. A plurality of merchants 12 (e.g., vehicle dealerships) may each use one or more merchant devices 40. Service system 60 may include a prequalification or qualification database 62, a cost database 64, and other databases useful in providing customer or product information. A comparison tool 70 may be in communication with each of the user devices 20 and each of the merchant devices 40 via a network 110, which may be the Internet or any other suitable communication infrastructure or network. In one aspect, service system 60 and comparison tool 70 may be integrated with each other (e.g., may be provided by one or more computing devices or as part of a distributed platform of devices). Such a configuration may facilitate the ability of comparison tool 70 to receive information from qualification database 62 and cost database 64.

User device 20 may include a computer system such as a desktop computer, mobile computer, or cellular phone that is operated by a user. In one aspect, the user of user device 20 may be a potential customer of one or more merchants 12. User device 20 may include memory, one or more processors, communication interfaces, input devices, and output devices, as will be described in further detail below with reference to FIG. 6. A communication interface (e.g., communication interface 660, FIG. 6) may facilitate communication between user device 20 and tool 70 via network 110. A display of user device 20 and/or one or more I/O devices may facilitate customer entry or modification of customer information via a customer portal, as described below.

Merchants 12 may be present in a plurality of different physical locations and may possess a stock or inventory of products, such as vehicles. In the example shown in FIG. 1, a first merchant A, a second merchant B, and a Zth merchant Z may each have one or more merchant devices 40 in communication with network 110. Any number of merchants 12 with any number of merchant devices 40 may be included in system environment 100. In one aspect, merchant devices 40 may include a computer system such as a desktop computer, mobile computer, or cellular phone that is operated by personnel of merchant 12.

Service system 60 may include one or more databases that store information for transmission to user device 20, merchant device 40, and/or comparison tool 70. Each of these databases 62 and 64 may include one or more storage devices, such as solid-state storage media (e.g., solid state drives and/or removable flash memory), optical storage media (e.g., optical discs), and/or magnetic storage media (e.g., hard disk drives) for storing information.

Qualification database 62 may store loan prequalification information or qualification information corresponding to a user of user device 20. Loan prequalification information may be specific to an individual user and may be determined based on the user's credit worthiness (e.g., a credit score such as a FICO score), a user's income, and/or other factors. Loan prequalification information may include at least one item of prequalification information. Items of prequalification information may include an approval amount (e.g., a pre-approval dollar value such as a maximum financing amount or an appropriate range of financing), a loan interest rate (e.g., an Annual Percentage Rate or APR or appropriate range of interest rates indicating a lowest interest rate and a highest interest rate associated with the individual user), a monthly loan payment and/or an expiration date for the loan prequalification. Each item of prequalification information may form a customer criterion.

Service system 60 may provide a qualification transmission (or qualification) to comparison tool 70 via network 110, as described below. The qualification provided to comparison tool 70 may include one or more of the items of loan prequalification information stored by qualification database 62. The qualification may be indicative of one or more values or ranges associated with a respective item of loan prequalification information, such as an approval amount value, a monthly loan payment value, or both. These values may be calculated in real-time (or near real-time) according to a credit policy of one or more lenders based on financial information received from a user as part of a prequalification process and thus may be considered as a true pricing quote, as opposed to an estimate. The qualification may be provided from service system 60 without requiring a credit inquiry (such as a so-called "hard credit pull"), and thus may be received and/or updated without adversely affecting a credit score of the user associated with the qualification.

Cost database 64 may store cost information including a tax cost, a title cost, or a license fee (registration fee), which may collectively be referred to as a tax, title, and license cost. Each (or some) items of cost information may be determined based on a location of a customer, a location of a merchant 12, or both. This location may be based on a location determined by user device 20 (e.g., by a global positioning system receiver of user device 20), and/or by merchant device 40 (e.g., by a global positioning system receiver of merchant device 40). Alternatively, location may be determined according to any other available methodology without departing from the scope of the present disclosure. If desired, cost database 64 may also store information corresponding to average industry costs, such as average industry costs for vehicle price, insurance, service contracts (warranty), and GAP (guaranteed asset protection) insurance. Cost information may be received from an industry database or may be provided by service system 60 itself, based on records of a service provider, such as a financial service provider.

Databases 62 and 64 may be in communication with comparison tool 70, and may provide customer criteria via database 62 (such as loan prequalification information included in the qualification) and cost information via database 64, to comparison tool 70 in a secure manner. Secure communication may be desirable as qualification database 62 may include proprietary and/or confidential information such as information that may allow for identification of an individual (personally identifiable information of a customer or user). Thus, service system 60 may limit access to one or more categories of information stored therein, or one or more particular pieces of information stored therein.

Comparison tool 70 may include a computer system or other computing device or may be provided in a distributed manner across a plurality of devices. Comparison tool 70 may include one or more servers, databases, etc. that provide a customer portal to user device 20 and a merchant portal to merchant device 40. It is to be understood that a portal, as described herein, includes applications (e.g., an application installed on user device 20 and/or merchant device 40), Internet websites, Internet-based software applications, or a combination thereof. Regardless of the precise implementation of comparison tool 70, tool 70 may facilitate the secure sharing of customer information to merchant device 40 and allows user device 20 to provide customer criteria or an updated customer criteria, as well as view a merchant reply or an updated merchant reply, as described below.

Figure 2:
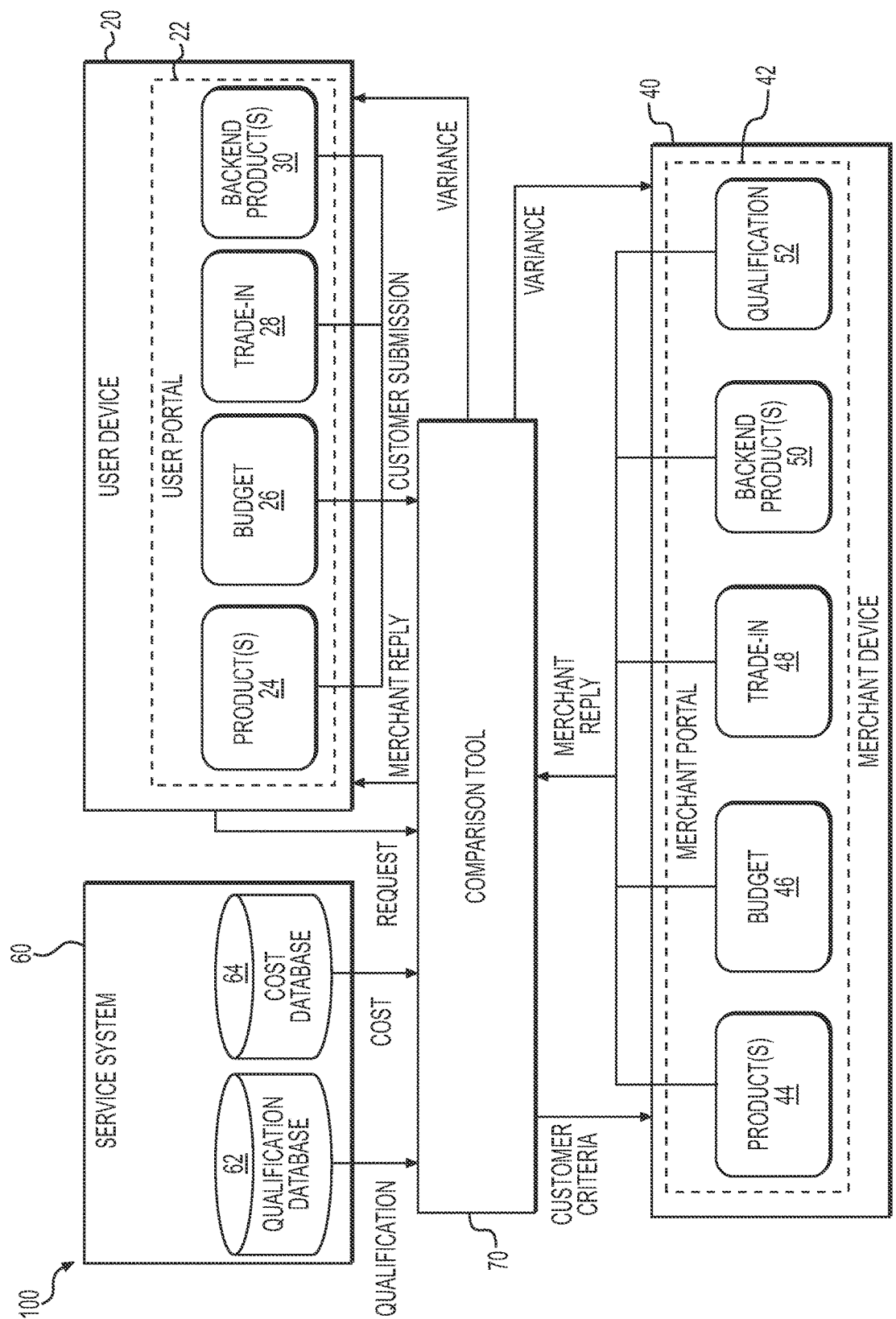
FIG. 2 is a block diagram illustrating the exemplary system environment, according to one or more embodiments.

FIG. 2 is a block diagram illustrating communication between features of system environment 100. As can be seen in FIG. 2, comparison tool 70 may receive customer criteria from service system 60 and user device 20. For example, tool 70 may receive a customer submission from user device 20 (e.g., corresponding to a user of user device 20), a qualification from qualification database 62, and cost information from cost database 64. The customer criteria received by tool 70 may include two or more of a vehicle price, a loan term, a down payment, a trade-in value, an insurance cost, a merchant fee, a loan interest rate, an amount of financing, a service contract cost, a tax cost, a title fee, a license fee, or a monthly payment amount (a monthly loan payment amount, a total monthly payment amount based on the customer submission, qualification, and cost information, or both a monthly loan payment amount and a total monthly payment amount). The customer criteria may also include a particular product and/or features or options associated with the product. When the product is a vehicle, the customer criteria may identify the vehicle (e.g., by make, model, VIN number, etc.) and may include one or more desired features associated with the vehicle (e.g., vehicle type, color, material options such as leather or upholstery, etc.) The customer criteria may include one or more backend products, such as service contract, extended warranty, GAP insurance, etc. Additionally, comparison tool 70 may receive one or more merchant replies from merchant device 40 that include a plurality of merchant criteria.

The qualification received by comparison tool 70 may include, for example, an approval amount or amount of financing (e.g., a pre-approval dollar value such as a maximum financing amount or an appropriate range of financing), an interest rate (e.g., an Annual Percentage Rate or APR or appropriate range of interest rates indicating a lowest interest rate and a highest interest rate associated with the individual user), a monthly loan payment, and/or a loan expiration date. One or more items included in the qualification may be determined based on customer criteria contained in the customer submission (e.g., a term length). The qualification may also be determined based on cost items (cost information) transmitted from cost database 64 via service system 60, such as a tax cost, a title cost, a license fee, or a combination thereof. The items included in the qualification may form customer criteria that are received by comparison tool 70 in addition to the customer criteria received from user device 20.

Comparison tool 70 may be configured to present user device 20 with a user portal 22 to allow an operator of user device 20 to interact with comparison tool 70. For example, comparison tool 70 may cause a display of user device 20 to display interactive objects, prompts, etc., via a user portal 22 to allow a customer to input one or more items of customer criteria for the customer submission (see, e.g., FIG. 3). When the product is a vehicle, a product preference may be indicative of one or more particular vehicles (e.g., as identified by a unit vehicle identification number), a particular make and/or model, a particular class of vehicle (e.g., sedan, sports car, truck, etc.), or one or more desired features of a vehicle. For example, a product entry 24 of user portal 22 may allow a user to input a product preference criterion. Product entry 24 may also allow a user to identify a product that is currently in the possession of a particular merchant (e.g., a particular dealer 12). The price may be provided as a value that reflects the price of the vehicle without additional costs (e.g., one or more of the costs stored in cost database 64).

Budget entry 26 may facilitate generation of a budget preference criterion that may be included in the customer submission. Exemplary budget preferences may include a desired total monthly payment (e.g., a maximum acceptable total monthly payment or a range of acceptable monthly payment values), a monthly interest payment (e.g., a maximum acceptable interest payment or a range of acceptable interest payment values), a down payment (e.g., a maximum acceptable down payment or a range of acceptable down payment values), and/or a loan term (e.g., a single loan term or a range of acceptable loan terms). The customer submission may include trade-in information corresponding to a user's trade-in offer (e.g., make, model, trim, mileage, etc.) entered via trade-in entry 28. In one aspect, trade-in information may include or be indicative of an industry value of a trade-in or a proposed value of a trade-in. If desired, a backend product entry 30 may be provided for a user to specify a desired or suggested backend product (e.g., a service contract, extended warranty, GAP insurance, or other backend product, and a maximum acceptable value or range of acceptable values for one or more of the backend products).

Comparison tool 70 may also receive a request from user device 20. This request may be initiated via the customer portal, for example. In one aspect, this request may be indicative of a request to transmit at least one customer criterion contained in the customer submission, and/or at least customer criterion contained in the qualification, to merchant device 40. The request may also be indicative of a request to transmit one or more items of cost information to merchant device 40. In one aspect, tool 70 may request and/or receive the qualification and the cost transmitted by system 60, in response to the request from user device 20.

In one aspect, the qualification, the cost, and the customer submission may be securely stored by comparison tool 70, e.g., in an encrypted manner. Comparison tool 70 may request an authentication from the merchant device 40 before transmitting customer criteria of the customer submission or customer criteria of the qualification. The authentication may be in the form of a username, password, and/or an alternative or additional authentication layer (e.g., via e-mail or SMS message). Thus, sensitive customer information such as personally-identifiable information may be secured by tool 70 and accessed only by authorized personnel of merchant 12 in response to the generation of the request.

The request may also be indicative of a request for merchant 12 to provide a merchant reply. Merchant portal 42 may facilitate the generation and secure transmission of the merchant reply in response to the request. Merchant portal 42 may, in a manner similar to user portal 22, be presented on a merchant device 40 via comparison tool 70. Thus, merchant portal 42 may cause a display of merchant device 40 to display interactive objects, prompts, etc., via portal 42 to allow a merchant 12 to input one or more items of a merchant reply. For example, portal 42 may present a series of entries similar to entries 24, 26, 28, and 30 of user portal 22. In one aspect, merchant portal 42 may present product entry 44, budget entry 46, trade-in entry 48, backend product entry 50, and/or qualification entry 52.

In one aspect, the request may be initiated by user device 20 to facilitate remote communication between user device 20 and merchant device 40 (e.g., when user device 20 is not present at a location of merchant 12). The request may allow the user device 20 to share one or more items of the customer submission without being present at merchant 12. In response to the request, comparison tool 70 may provide one or more items of the merchant reply to user device 20. Thus, the request may correspond to a request for a quote from merchant 12. The merchant reply may reflect an offer transmitted to user device 20 via comparison tool 70 in response to one or more items contained in the customer submission. Thus, communication between a user and a merchant may be facilitated without the need for the user device 20 to be physically present at merchant 12. In another aspect, when user device 20 is present at merchant 12, a merchant reply may be provided to user device 20 via comparison tool 70 in response to, for example, a proposal initiated by merchant 12. For example, merchant device 40 may be configured to provide a merchant reply (or proposal) to a user device 20 present at merchant 12 to trigger a notification displayed on user device 20. This notification may correspond to a new merchant reply or an update to a previous merchant reply. The notification may, when accessed by the user, cause user device 20 to present a display with information representative of the merchant reply and/or the customer submission (e.g., display 300), as described below.

The merchant reply may include one or more items that correspond to respective items of the customer submission. Entries 44, 46, 48, and 50, may respectively correspond to entries 24, 26, 28, and 30, and may include corresponding criteria from the perspective of the merchant. Additionally, entry 52 may provide a merchant qualification criterion of the merchant reply. The merchant qualification may include one or more items that may be compared to the items of the qualification transmitted by system 60. In one aspect, the merchant qualification of entry 52 may be received from one or more lenders. The one or more lenders may be associated with the merchant and/or comparison tool 70 or service system 60.

Once tool 70 receives at least an initial customer submission and an initial merchant reply, tool 70 may determine a variance between the customer submission and the merchant reply relative to at least one criterion. In an exemplary configuration, tool 70 may be configured to determine the variance for every item contained in the customer submission and merchant reply. Alternatively, the variance may be determined for a subset of customer and merchant criteria.

In one aspect, the variance may reflect a difference between a criterion of the customer submission and the corresponding criterion of the merchant reply. For example, the product item or criterion contained in the customer submission may include a corresponding value or price, for example $19,000. The product criterion in the merchant reply may include a merchant value which may be higher than, lower than, or the same as the customer value. For example, the merchant value may be $18,500. In such an example, the variance may be represented by the difference in price, or $500. Each variance may be reflected from the perspective of the merchant or from the perspective of the customer. In the example of a difference in price of $500, this difference may be represented from the perspective of the customer (e.g., −$500, representing a lower price presented in the merchant reply) or from the perspective of the merchant (e.g., $500, representing a larger value in the customer criteria). Additionally, a quantifiable value may be represented by illustrating a percentage. In this example, a value of −2.6% (or 2.6%) may also be employed as a variance.

In one aspect, when an item in the customer submission is empty (e.g., a user of the user device 20 does not input a backend product item), the variance may provide an assumed value for the empty item. This assumed value may be an average value or may be a default value such as zero. Thus, a variance may include a difference between the empty item and the corresponding item contained in the merchant reply. In one aspect, cost database 64 may provide an average value, which may be an industry average. While the variance may be determined by comparison tool 70, it may also be possible to determine the variance by merchant device 40, for example by transmitting the customer criteria to the merchant device.

Figure 3:
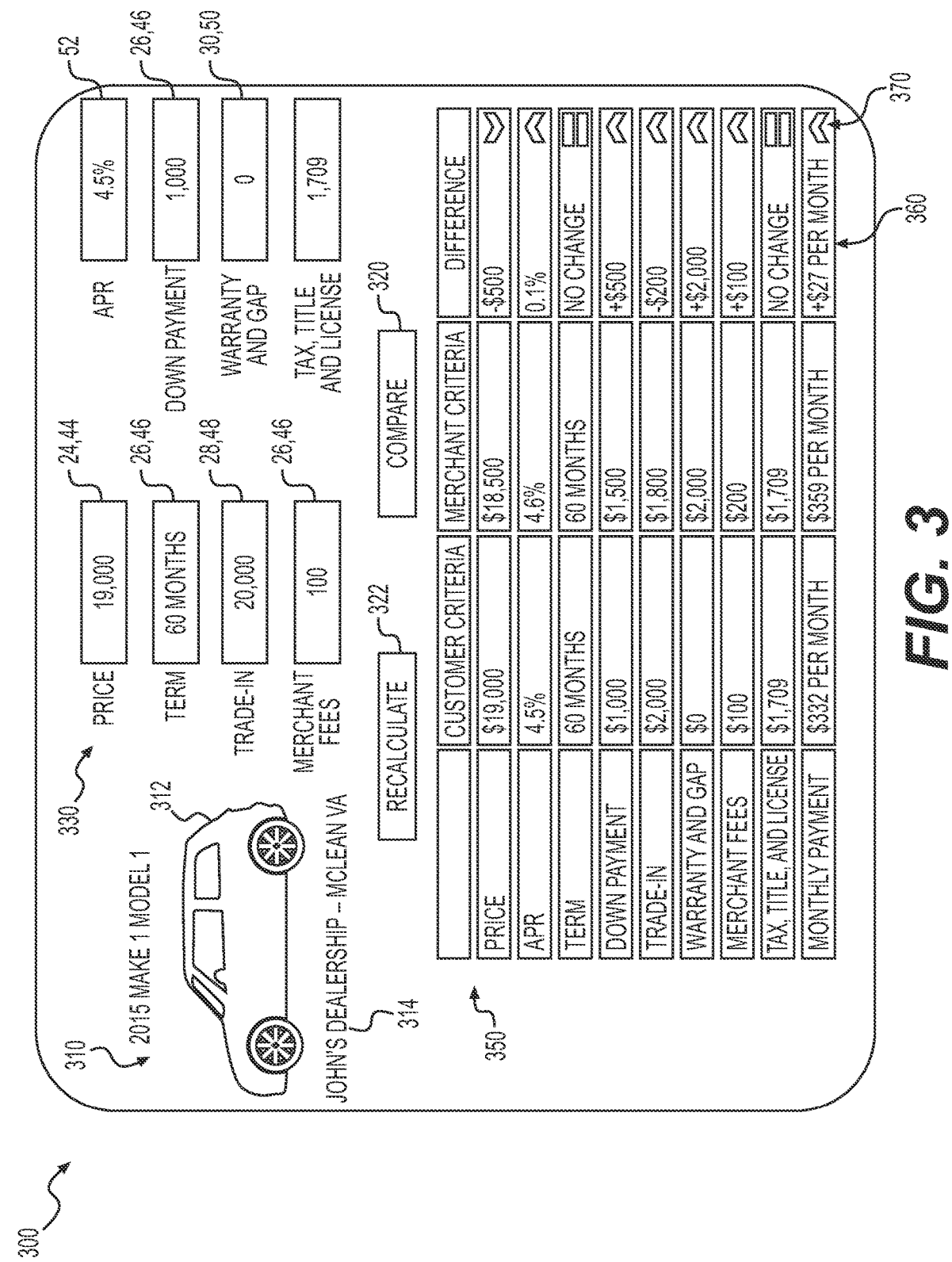
FIG. 3 is a representation of an exemplary display presented on a customer device or a merchant device, according to one or more embodiments.

FIG. 3 provides a depiction of an exemplary display 300 presented by a display device of user device 20 (e.g., implemented via user portal 22) or merchant device 40 (e.g., implemented via merchant portal 42). As can be seen in FIG. 3, display 300 may include a product indicator 310 that corresponds to the product identified by product entry 24 and/or product entry 44. Display 300 may also include one or more entries 330 that allow the user, the merchant, or both, to modify the customer submission and merchant reply. A comparison indicator 350 may provide a visual indication of the customer criteria, the merchant reply, and the variance between the submission and reply. Comparison entry 320 and update entry 322 may facilitate transmission and update of the customer submission and/or merchant reply.

Indicator 310 of display 300 may include a product image 312 that provides a visual and/or textual indication of the product. The product identified in indicator 310 may correspond to a product identified via product entry 24 and/or product entry 44. A merchant indicator 314 may identify the merchant 12 that possesses the product identified by product image 312 (e.g., the merchant having supplied/associate with the merchant reply).

Entries 330 may present items (criteria) of a customer submission or a merchant reply. Entries 330 may also present customer criteria of the qualification, and/or cost information, from service system 60. In the example shown in FIG. 3, display 300 is illustrated from the perspective of the user device 20. Thus, entries 330 may correspond to the customer submission and may be used to provide items in the customer submission portion of comparison indicator 350. Display 300 may be provided in a similar format for the merchant device. In such a case, entries 330 may correspond to the merchant reply and may be used to provide the items in the merchant reply portion of comparison indicator 350.

The product indicated in indicator 310 and price entered in product entry 44 may have been previously selected by navigating images corresponding to products in the inventory of a particular merchant 12, for example. Additionally or alternatively, entries 330 may include a price entry which corresponds to product entry 24, 44 and allows a user to set a particular price. Entries 330 may additionally include a term entry, a down payment entry, and a merchant fees entry, which may provide an exemplary budget entry 26 or 46. A trade-in entry may form an example of trade-in entry 28, 48. An entry for warranty and GAP insurance may correspond to backend products entry 30, 50.

One or more entries 330 may be determined based at least in part on the qualification received from qualification database 62. For example, an APR or other exemplary customer criterion of the qualification may be displayed in display 300 may be determined based on credit worthiness data for a particular user of user device 20, as described above. Additionally, customer or merchant criteria, including the qualification, may be updated based on the information provided via entries 330. A value of an APR may be revised (updated) in response to an update of one or more of the entries 330. For example, the APR may be updated in response to a change in the loan term input via entry 26. This updated APR may be received from service system 60. Thus, when a value such as a loan term is modified via budget entries 26 or 46, tool 70 may request an updated qualification from system 60 based on the updated value.

As shown in the lower portion of FIG. 3, comparison indicator 350 may depict a monthly payment amount criterion of the customer criteria and/or the merchant reply. This monthly payment may be a total monthly payment that is calculated based on a plurality of the other criteria (e.g., in the customer submission and qualification) and costs (e.g., price, APR, term, down payment, trade-in, backend products such as warranty and GAP, merchant fees, and tax, title and license). Thus, the monthly payment criterion may be updated in response to the modification of customer or merchant criteria. When one or more items of customer criteria are updated or modified, comparison tool 70 may request an updated qualification (including e.g., customer criteria such as an updated loan interest rate, approval amount, and/or expiration date), enabling the receipt and presentation of up-to-date prequalification information (e.g., in real-time) and real time adjustment of the monthly payment criterion. Each comparison indicator 350 may be updated in real-time accordingly. A monthly loan payment amount may be presented instead of, or in addition to, a total monthly payment amount.

In one aspect, one or more entries 330 may be locked for editing based on the identity of the device. For example, comparison tool 70 may allow user device 20 to enter or edit a term, trade-in, merchant fees, and warranty and GAP, to construct a customer submission. The price, APR, tax, title and license, or other entries may be fixed (non-editable) for user device 20 as these entries may be determined from the merchant device 40, qualification database 62, and cost database 64, respectively.

Comparison indicator 350 may be based on both the customer criteria and the merchant reply. In the exemplary configuration shown in FIG. 3, a first column of indicator 350 may correspond to a name or identification of a particular criterion. A second column of indicator 350 may provide information corresponding to the value of the corresponding customer criterion. A third column of indicator 350 may provide information corresponding to a value of the corresponding criterion of the merchant reply. A fourth column of indicator 350 may indicate a variance value 360 of the variance between the customer criteria and the merchant reply for the corresponding item identified in the first column. For example, a price contained in the customer submission may be $500 more than a price contained in the merchant reply. The corresponding variance value 360, which may be determined by tool 70 and transmitted to user device 20 and/or merchant device 40, may be $500 or −$500. This variance may be determined from the perspective of the customer or the merchant, and may be provided in a percentage or any other appropriate manner.

In addition to variance value 360, the variance may be represented by one or more indicators 370 that correspond to individual item(s) of the variance. Indicator 370 may provide a notification whether a particular variance value 360 represents a benefit to the user, a benefit to the merchant, or a match between the customer submission and the merchant reply. In the example shown in FIG. 3, indicative of the viewpoint of the customer, a customer benefit may be represented by an upward-facing chevron or arrow, while a merchant benefit may be represented by a downward-facing chevron or arrow. A match between the customer submission and the merchant reply may be represented by symbol such as an equal sign (=). Symbols other than these may be employed for indicator 370. Indicators in addition to shape, such as colors, may be included as indicators 370. In such an example, the color green may correspond to a user benefit, while the color red may correspond to a merchant benefit.

With continued reference to the example of user portal 22, a comparison entry 320 may be provided to initiate generation of the request from user device 20 to comparison tool 70. Comparison entry 320 may allow the user to provide one or more items of customer criteria. Additionally, comparison entry 320 may facilitate the transmission of the merchant reply from merchant device 40.

Display 300 may also include an update entry 322 that may facilitate real-time updates of the customer criteria and/or the merchant reply. Interaction with update entry 322 may initiate an update of one or more portions of comparison indicator 350, including the customer criteria, merchant criteria, and variance value 360 and indicator 370. Additionally or alternatively, update entry 322 may allow any updated criteria to be transmitted from user device 20 to merchant device 40 via tool 70, or from merchant device 40 to user device 20 in a similar manner. Thus, tool 70 may allow a secure process for remotely update the customer criteria or merchant reply in real-time.

Figure 4:
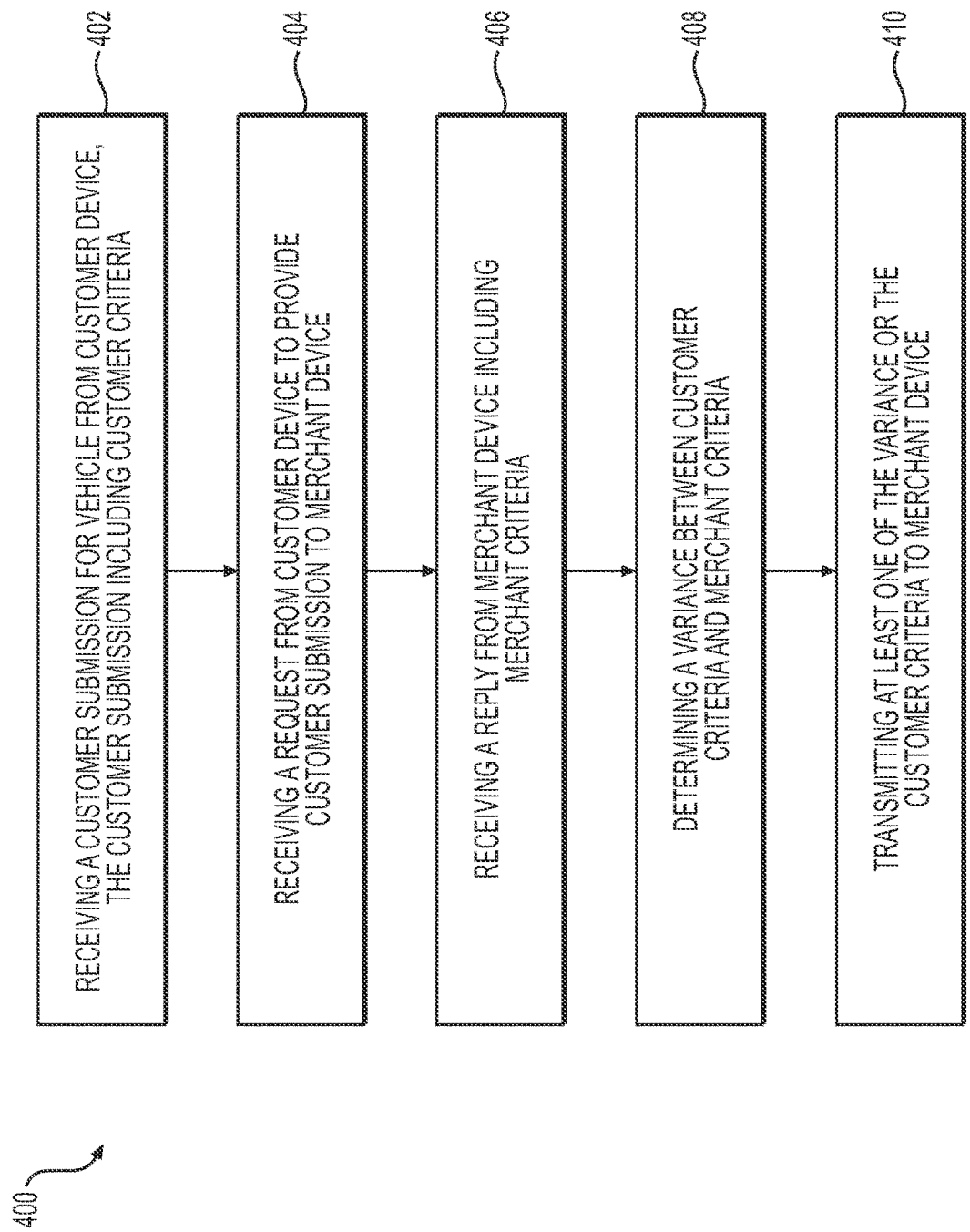
FIG. 4 is a flowchart of an exemplary process for transmitting at least one of a variance or customer criteria to a merchant device, according to one or more embodiments.

FIG. 4 is a flowchart illustrating a computer-implemented method 400 including transmitting at least one of a variance or customer criteria to a merchant device 40. In a step 402 of method 400, a customer submission may be received from user device 20. In the exemplary environment 100 shown in FIGS. 1 and 2, the customer criteria included in the customer submission may be received by comparison tool 70 via network 110. Step 402 may also include receiving customer criteria from service system 60, such as customer criteria included in the qualification provided by qualification database 62, and/or cost information provided by cost database 64. As the qualification from service system 60 may correspond to a prequalification offered to a customer, comparison tool 70 may receive a true or actual qualification associated with the user of user device 20.

In a step 404, a request to provide the customer submission may be received by tool 70. This request may be generated by user device 20. For example, this request may be generated in response to an interaction with a comparison entry 320, as described above.

In step 406, tool 70 may receive a merchant reply transmitted from merchant device 40. The merchant reply may be generated as a response to the customer submission. The merchant criteria provided in the merchant reply may include one or more items received from product entry 44, qualification entry 46, trade-in entry 48, backend product entry 50, or qualification entry 52, as described above. If desired, a portion or the entirety of the merchant reply may be transmitted by comparison tool 70 to user device 20 via user portal 22.

In a step 408, comparison tool 70 may determine the variance between at least one item of customer criteria and at least one corresponding item of merchant criteria. Taking the example of the product price component of the customer criteria and the merchant criteria, tool 70 may determine a numerical value representative of the difference between these two items. In one aspect, the variance determined by tool 70 may include, in addition to or instead of a numerical value, a flag or other indication associated with a benefit associated with the variance. When the item is price, and the price in the merchant reply is a value lower than a value contained in the customer criteria, the variance may include a flag that corresponds to a benefit for the user or customer. The variance may also indicate when an item in the customer criteria is equivalent to the respective criterion in the merchant reply.

In a step 410 that may follow step 408, comparison tool 70 may transmit the variance, the customer criteria, or both, to the merchant device 40. Transmitting the variance may include transmitting the difference between an item of customer criteria and a corresponding item of merchant criteria. The transmission of the variance may include transmission of a flag or other indication of a benefit to the customer or merchant, or an indication that the item is equivalent in the customer criteria and the merchant criteria. When the customer criteria are transmitted, at least one item of customer criteria may be provided to the merchant device 40. By providing customer criteria contained in the qualification, an accurate assessment of a payment may be provided. For example, merchant device 40 may present a value corresponding to a monthly cost (e.g., a total monthly cost value) that corresponds to the qualification. This monthly cost may be presented in display 300 of merchant device 40 by comparison indicator 350. Step 410 may also include transmitting a value that was input via entries 24, 26, 28, or 30. In one aspect, step 410 may include transmitting both the variance and the customer criteria to the merchant device 40.

Figure 5:
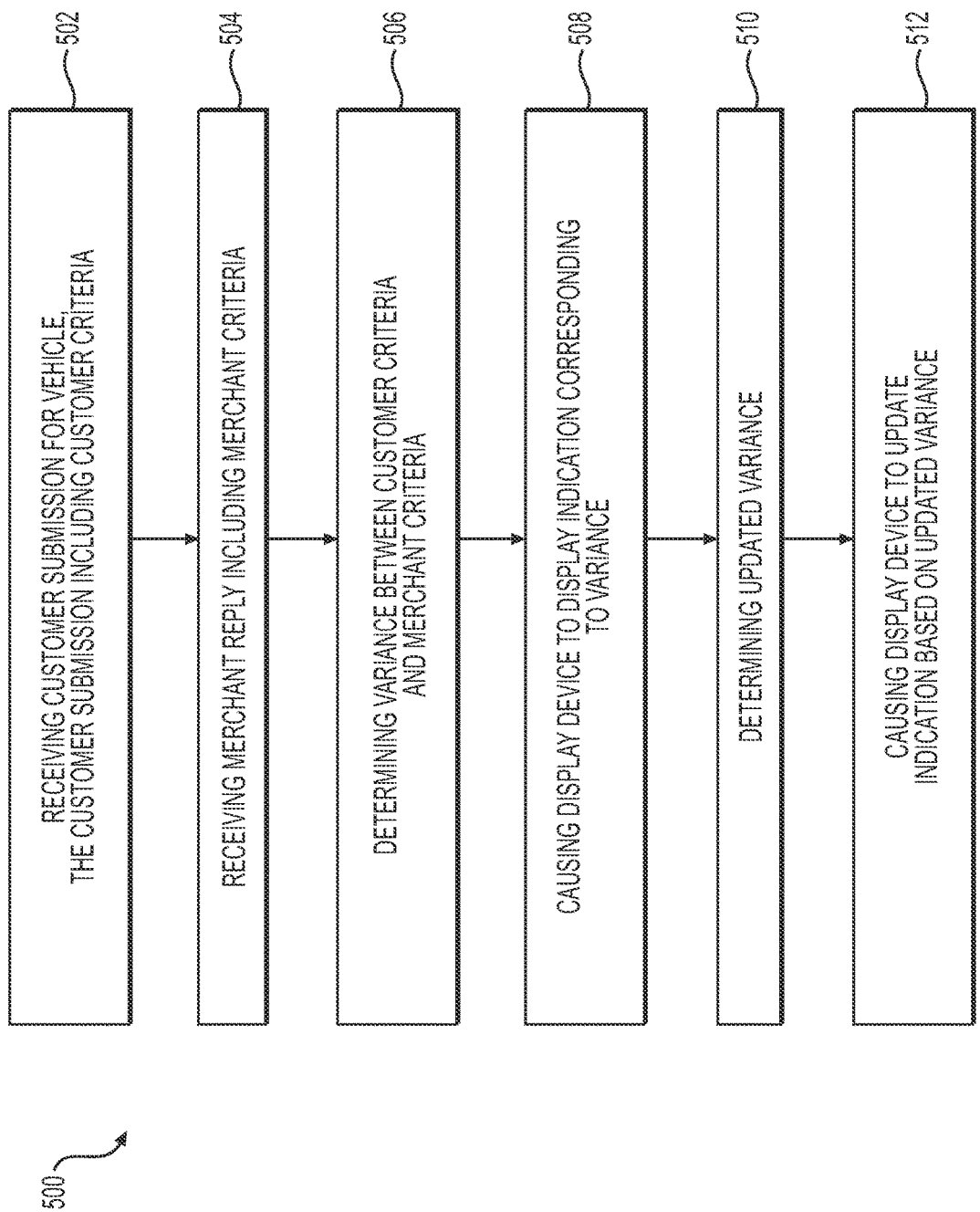
FIG. 5 is a flowchart of an exemplary process for determining and providing an updated variance, according to one or more embodiments.

FIG. 5 is a flowchart illustrating a computer-implemented method 500 for providing an updated variance. Method 500 may include a step 502 in which a customer submission for a vehicle may be received, e.g., by comparison tool 70. Step 502 may be performed in a manner similar to step 402.

In a step 504, a merchant reply may be received by tool 70. Step 504 may be performed in the manner described above with respect to step 406 of method 400.

Step 506 may be performed based on the customer submission received in step 502 and the merchant reply received in step 504. In one aspect, step 506 may include determining a variance between at least one item of customer criteria and at least one item of merchant criteria. As discussed above, the variance may represent a value, such as a numerical value or a percentage, and in at least some embodiments, an indication of a benefit associated with this value.

Step 508 may be performed based on the variance determined in step 506. Step 508 may include causing a display device (e.g., via input and output ports 650, FIG. 6) to display an indication corresponding to the variance. For example, with reference to FIG. 3, display 300 presented on user device 20, merchant device 40, or both, may include a comparison indicator 350 presented via user portal 22 and merchant portal 42. The comparison indicator 350 may include a display of the variance value 360 and indicator 370.

In step 510, one or more items of customer criteria may be updated or modified. Additionally or alternatively, step 510 may include updating or modifying one or more items of the merchant reply. In one example, a merchant may update a value of the down payment by interacting with entry 46. After changing the value via entry 46 (or any other appropriate entry), update entry 322 may then be selected. In response to the change in the value of the down payment item via entry 46, tool 70 may recalculate one or more criteria contained in the merchant reply. For example, qualification entry 52 and the corresponding portion of comparison indicator 350, such as an APR, may be updated based on the change in entry 46. In one aspect, an updated qualification may be received from service system 60 in response to a change introduced via budget entry 26, 46. Merchant device 40 may communicate with tool 70, for example, to retrieve an updated qualification and update the corresponding portion of comparison indicator 350. This updated qualification may be employed to update qualification entry 52. Thus, the qualification may be updated in real-time by updating one or more entries. Additionally, a monthly payment portion of the comparison indicator 350 may be updated based on the updated criteria. Once one or more items of the customer criteria and merchant reply have been updated as necessary, tool 70 user device 20, and/or merchant device 40 may determine an updated variance.

In step 512, display 300 may be updated to cause the display device to display an indication corresponding to the update variance as determined in step 510. This may include updating one or more elements of comparison indicator 350, as well as variance values 360 and indicators 370.

The disclosed methods and systems may facilitate the provision of customer criteria from a customer to a merchant 12, including secure provision of a qualification corresponding to the customer. The user and the merchant may be able to enter, revise, or otherwise update one or more items of customer criteria and/or merchant criteria on a shared interface on the user device 20 or the merchant device 40. The updated criteria may be used to securely receive an updated qualification. The updated criteria, which may include the updated qualification, may be presented by a user device 20, a merchant device 40, or both. Thus, barriers to communication between the merchant and the user are reduced and both parties are able to readily understand how changes in individual elements affect the overall agreement. Additionally, a qualification may be received and updated without requiring a credit inquiry, allowing an accurate evaluation of an interest rate, financed amount, and/or monthly payment without adversely affecting a credit score of the user.

Figure 6:
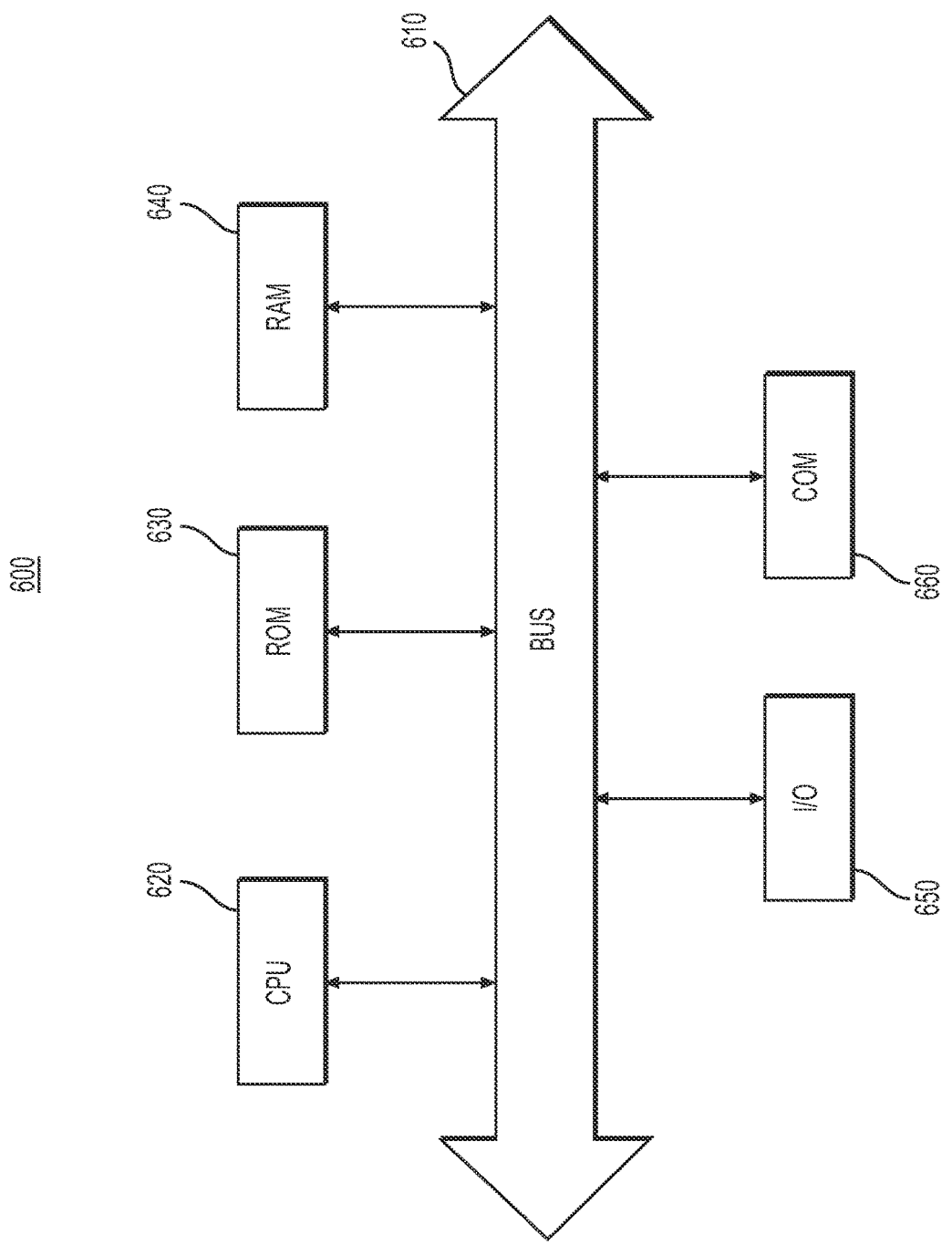
FIG. 6 is a block diagram depicting an exemplary system that may execute techniques presented herein.

FIG. 6 depicts an exemplary system 600 that may execute techniques presented herein. FIG. 6 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 660 for packet data communication. The platform also may include a central processing unit ("CPU") 620, in the form of one or more processors, for executing program instructions. The platform may include an internal communication bus 610, and the platform also may include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, comprising:
   causing a customer device associated with a customer to display a user portal that includes one or more interactive objects configured to receive input of customer criteria from the customer via the customer device;
   receiving, from the customer device, a customer submission including the input customer criteria and a request entered by the customer via the customer device to provide the customer submission to a merchant device;
   in response to receiving the request, automatically causing the merchant device to display a merchant portal that includes one or more further interactive objects configured to receive input of merchant criteria from a merchant associated with the merchant device;
   receiving, from the merchant device, a reply including the merchant criteria entered by the merchant via the merchant device; and
   in response to receiving the reply, automatically:
      determining a variance between the customer criteria and the merchant criteria; and
      causing the customer device to update the display of the user portal so as to include the variance.

2. The computer-implemented method of claim 1, further comprising:
   receiving qualification information from a service database.

3. The computer-implemented method of claim 2, wherein the customer submission further includes at least one customer criterion based on the qualification information received from the service database.

4. The computer-implemented method of claim 3, wherein determining the variance includes determining a difference between the qualification information and a merchant qualification information included in the merchant criteria.

5. The computer-implemented method of claim 4, wherein the qualification information includes one or more of a loan term or a loan interest rate.

6. The computer-implemented method of claim 1, wherein the customer criteria includes one or more of a vehicle price, a loan term, a down payment, a trade-in value, an insurance cost, a merchant fee, a loan interest rate, an amount of financing, a service contract cost, a tax cost, a title fee, a license fee, or a monthly payment amount.

7. The computer-implemented method of claim 1, further comprising:
   receiving an updated reply from the merchant device.

8. The computer-implemented method of claim 7, further comprising:
   updating the variance based on the updated reply.

9. The computer-implemented method of claim 8, further comprising:
   causing the customer device to update the display of the user portal so as to include at least one of the updated variance or the updated reply.

10. The computer-implemented method of claim 1, further comprising:
    receiving an updated customer submission.

11. The computer-implemented method of claim 10, further comprising:
    determining an updated variance based on the updated customer submission; and
    causing the merchant device to update the display of the merchant portal so as to include at least one of the updated variance or the updated customer submission.

12. The computer-implemented method of claim 1, further comprising:
    determining whether the variance reflects a customer benefit for at least a portion of the customer criteria.

13. The method of claim 12, further comprising:
    causing the customer device to further update the display of the user portal to include a visual indication of the customer benefit.

14. A system, comprising:
    at least one memory storing instructions; and
    at least one processor operatively connected to the at least one memory, and configured to execute the instructions to perform operations, including:
       causing a customer device associated with a customer to display a user portal that includes one or more interactive objects configured to receive input of customer criteria from the customer via the customer device;
       receiving, from the customer device, a customer submission including the input customer criteria and a request entered by the customer via the customer device to provide the customer submission to a merchant device;
       in response to receiving the request, automatically causing the merchant device to display a merchant portal that includes one or more further interactive objects configured to receive input of merchant criteria from a merchant associated with the merchant device;
       receiving, from the merchant device, a reply including the merchant criteria entered by the merchant via the merchant device; and
       in response to receiving the reply, automatically:
          determining a variance between the customer criteria and the merchant criteria; and
          causing the customer device to update the display of the user portal so as to include the variance.

15. The system of claim 14, wherein:
    the operations further include receiving qualification information from a service database that includes one or more of a loan term or a loan interest rate;
    the customer submission further includes at least one customer criterion based on the qualification information received from the service database; and
    determining the variance includes determining a difference between the qualification information and a merchant qualification information included in the merchant criteria.

16. The system of claim 14, wherein the customer criteria includes one or more of a vehicle price, a loan term, a down payment, a trade-in value, an insurance cost, a merchant fee, a loan interest rate, an amount of financing, a service contract cost, a tax cost, a title fee, a license fee, or a monthly payment amount.

17. The system of claim 14, wherein the operations further include:
  receiving an updated reply from the merchant device;
  updating the variance based on the updated reply; and
  causing the customer device to update the display of the user portal so as to include at least one of the updated variance or the updated reply.

18. The system of claim 14, wherein the operations further include:
  receiving an updated customer submission;
  determining an updated variance based on the updated customer submission; and
  causing the merchant device to update the display of the merchant portal so as to include at least one of the updated variance or the updated customer submission.

19. The system of claim 14, wherein the operations further include:
  determining whether the variance reflects a customer benefit for at least a portion of the customer criteria; and
  causing the customer device to further update the display of the user portal to include a visual indication of the customer benefit.

20. A computer-implemented method, comprising:
  causing a customer device associated with a customer to display a user portal that includes one or more interactive objects configured to receive input of customer criteria from the customer via the customer device;
  receiving qualification information from a service database;
  receiving, from the customer device, a customer submission including the input customer criteria and a request entered by the customer via the customer device to provide the customer submission to a merchant device, wherein the customer criteria includes (i) at least one customer criterion based on the qualification information received from the service database and (ii) one or more of a vehicle price, a loan term, a down payment, a trade-in value, an insurance cost, a merchant fee, a loan interest rate, an amount of financing, a service contract cost, a tax cost, a title fee, a license fee, or a monthly payment amount;
  in response to receiving the request, automatically causing the merchant device to display a merchant portal that includes one or more further interactive objects configured to receive input of merchant criteria from a merchant associated with the merchant device;
  receiving, from the merchant device, a reply including the merchant criteria entered by the merchant via the merchant device; and
  in response to receiving the reply, automatically:
    determining a variance between the customer criteria and the merchant criteria;
    determining whether the variance reflects a customer benefit for at least a portion of the customer criteria; and
    causing the customer device to update the display of the user portal so as to include a visual indication of the customer benefit and the variance.

* * * * *